3,411,865
METHOD OF REMOVING SULFUR
DIOXIDE FROM GASES
Franciscus W. Pijpers and Maria M. J. J. Starmans, Amsterdam, Netherlands, assignors to Shell Oil Company, New York, N.Y., a corporation of Delaware
No Drawing. Filed Aug. 19, 1964, Ser. No. 390,754
Claims priority, application Netherlands, Oct. 3, 1963, 298,751
8 Claims. (Cl. 23—2)

ABSTRACT OF THE DISCLOSURE

Method of removing sulfur dioxide from hot gaseous mixtures comprising contacting said hot gaseous mixtures with a solid acceptor for sulfur dioxide comprising a mixture of an alkali metal oxide and a minor amount of iron oxide and, optionally antimony oxide, on a carrier selected from the group consisting of alumina, magnesia and chromia.

---

This invention relates to an improvement in a process and catalyst for removing sulfur dioxide from flue gases.

Air pollution with sulfur dioxide is a major problem in the United States today. Sulfur dioxide is objectionable not only because of its extremely unpleasant odor but is also toxic in concentrations over about 10 parts per million, and is destructive to vegetation in concentrations of 1 part per million and lower. Sulfur dioxide and its oxidation product, sulfuric acid, are the principal cause of acidity in rain and fog which can in turn be very corrosive. The problem is indeed a large one; it was estimated in 1960 that 21 million tons per year of $SO_2$ are released to the atmosphere of the United States from combustion of fuel oil and coal. As a result of recent concern with smog and air pollution, increased legislation restricting the amounts of pollutants released to the atmosphere is expected. Accordingly, the present invention, which allows economic removal of $SO_2$ from gas mixtures on an industrial scale, is very desirable.

The U.S. Bureau of Mines has developed a process for the removal of $SO_2$ through the use of solid "acceptors" at flue gas temperatures. This process has distinct advantages over liquid absorption processes which require excessive cooling of the gases which are utimately discharged at low temperatures and remain near ground level, sometimes causing as much or more local pollution than the untreated flue gas. The Bureau of Mines process obviates these problems by effecting removal at flue gas temperature, allowing ready dissipation of the stack gases into the upper atmosphere. This process is described in Bureau of Mines report No. 5735, "Process Development in Removing Sulfur Dioxide From Hot Flue Gases," part I, 1961. This report described a process wherein $SO_2$-containing gas is contacted at about 100–500° C. with a solid acceptor which is subsequently regenerated by contacting with a reducing gas such as hydrogen and/or carbon monoxide. Supported alkali metal compounds, for example, alkalized alumina, are used as acceptors. The acceptor functions by binding the sulfur dioxide as a sulfate.

It has now been discovered that a more efficient acceptor comprises in addition to supported alkali metal, iron or a combination or iron and antimony. This discovery is surprising because iron and iron compounds or antimony and antimony compounds are not suitable in themselves to bind sulfur dioxide. For instance, an acceptor consisting of ferric oxide on alpha-alumina is not capable of binding more than very small quantities of sulfur dioxide. Similarly, antimony pentoxide supported on alumina is unsuitable as an acceptor. Not only do these new acceptors increase the capacity of the supported alkali acceptors but they also improve regenerability which proceeds faster and to a greater extent than with the conventional catalysts.

The beneficial effect of the presence of iron or iron compounds in the acceptor is apparent when the iron is present in very small amounts. It is preferred to include a quantity by weight of iron which is at least 0.01% of the content in percent by weight of alkali metal. Particular preference is given to acceptors in which the iron content is from 0.01% to 20%, especially 0.2% to 10%, of the alkali metal content. In a preferred aspect of the invention the acceptor contains antimony or antimony compounds in addition to alkali metal and iron. The beneficial effects of the additional presence of antimony are also apparent at very low concentrations of antimony. Antimony contents of at least 0.01%, preferably 0.01 to 20%, especially 0.2 to 10% by weight of alkali metal content are preferred.

The content of alkali metal compounds in the acceptor may vary within wide limits. The content of alkali metal compounds in general is at least 1%, preferably at least 5%, especially 5–25% by weight of the acceptor calculated as percent by weight of alkali metal. The kind of iron and antimony compounds used to prepare the acceptor is not critical; as examples mention can be made of nitrates, sulfates, halides, sulfides, tartrates, oxalates, carbonates, etc. It is most desirable to employ an anion which will decompose on calcining. After calcining, the metals are present on the carrier as oxides; for convenience, however, calculations of the amount of metal dispersed on the acceptor are based on the amount of metal rather than the amount of metal compound.

Any stable solid carrier material such as magnesium oxide, aluminum oxide, and chromium oxide are suitable carriers. Preferred carrier material is aluminum oxide, especially alpha alumina.

Sulfur dioxide acceptance is usually effected at approximately flue gas temperature. Suitable temperatures, for example, are from about 150 to 400° C.; acceptance temperatures of 250–300° C. are preferred. Any process technique known to establish contact between a gas and solid may be used in effecting $SO_2$ removal; for example, fixed bed, moving bed and fluid bed techniques may be mentioned. The good acceptance and regeneration performance of the acceptors of the invention makes the process particularly amenable to continuous processing.

For economical operations, regeneration characteristics of the acceptor are critical. The acceptors of the invention excel both in rate of regeneration and degree of regenerability. The rate of regeneration of alkali acceptors based on alkali metals approximately doubles upon addition of iron or iron compounds. If antimony or antimony compounds are added in addition to the iron, the regeneration rate further increases six-fold. Degrees of regenerability increase on the same order of magnitude.

Regeneration is carried out at elevated temperatures in the presence of a reducing gas. Temperatures required for regeneration may vary within wide limits but are preferably within 500–700° C., especially 600–700° C. Suitable regeneration gases are hydrogen, hydrogen-containing gas mixtures, carbon monoxide, and carbon monoxide-containing gas mixtures. Preferred regeneration gases are low-boiling hydrocarbons or gases containing low-boiling hydrocarbons, for example, methane and natural gas. The acceptor may be raised to regeneration temperature by heating the acceptor with a gas mixture which has been obtained by burning the reducing gas with an underdose of air, thus effecting the regeneration simultaneously with heating. If desired, the reducing gas or gas mixture may be preheated in the equipment in which the sulfur dioxide is bound to the acceptor.

The acceptor applied in the process according to the invention may be prepared in any known manner. An example of known techniques is a method wherein the carrier is impregnated with solutions of the active components and is subsequently dried and/or calcined. Another method is to mix the active material and the carrier intimately by means of coprecipitation and subsequently to dry and/or calcine the mixture.

EXAMPLES

To illustrate the benefits of acceptors of the invention, the following acceptors were prepared and used in the process of the invention:

I.—Sodium oxide on alpha-alumina

The preparation of this acceptor took place by impregnation of alpha-alumina with a saturated solution of sodium nitrate in water, drying under vacuum at 120° C. and calcining for three hours at 500° C. under air flow. The properties of the newly prepared acceptor were as follows:

Grain size _____ mm__ 0.5–4
Sodium content _____ percent wt__ 12.5

II.—Iron oxide on alpha-alumina

Alpha-alumina was impregnated with a saturated solution of ferric nitrate in water. After drying under vacuum at 120° C., calcination was carried out for three hours under air flow.

The properties of the newly prepared acceptor were as follows:

Grain size _____ mm__ 0.5–4
Iron content _____ percent wt__ 9.1

III.—Sodium oxide and iron oxide on alpha-alumina

The preparation of this acceptor took place according to the method described on page 11 of the Report No. 5735, "Process Development in Removing Sulfur Dioxide from Hot Flue Gases," Part I (1961), U.S. Department of the Interiors, Bureau of Mines. The aluminum sulfate solution which was mixed with the sodium carbonate solution also contained ferrous sulfate. The properties of the newly prepared acceptor were as follows:

Grain size _____ mm__ 0.5–4
Sodium content _____ percent wt__ 22.2
Iron content _____ do__ 0.23

IV.—Potassium oxide and antimony oxide on alpha-alumina

The preparation of this acceptor took place as follows: alpha-alumina was impregnated with a solution of potassium antimonyl tartrate in water saturated at 90° C. After drying under vacuum at 120° C. calcination was carried out at 500° C. for three hours under air flow.

The properties of the newly prepared acceptor were as follows:

Grain size _____ mm__ 0.5–4
Potassium content _____ percent wt__ 2.74
Antimony content _____ do__ 8.5

V.—Sodium oxide, iron oxide and antimony oxide on alpha-alumina

The preparation of this acceptor took place by impregnation of alpha-alumina with a saturated solution of sodium nitrate in water which contained also ferrous sulfate and potassium antimonyl tartrate. After drying under vacuum at 120° C., calcination was carried out for three hours at 500° C. under air flow. The properties of the newly prepared acceptor were as follows:

Grain size _____ mm__ 0.5–4
Sodium content _____ percent wt__ 10.2
Iron content _____ do__ 0.06
Potassium content _____ do__ 0.019
Antimony content _____ do__ 0.06

The acceptors prepared above were applied in removing sulfur dioxide from a gas mixture. This gas mixture was a synthetic flue gas having the following composition:

|  | Percent m. |
|---|---|
| $CO_2$ | 13.2 |
| $O_2$ | 6.0 |
| $N_2$ | 73.1 |
| $H_2O$ | 5.4 |
| $SO_2$ | 2.2 |

This gas mixture was passed over the acceptors in a reactor as described in the Bureau of Mines Report No. 5735.

Useful life of the acceptors was determined by moment of breakthrough of sulfur dioxide in the flue gas. Breakthrough times, which were taken to be the time expressed in minutes for the $SO_2$ concentration in the effluent gas to reach 50 p.p.m., are tabulated below. Loaded acceptors were regenerated with methane. Acceptors II and IV were not regenerated because of low breakthrough loadings. For acceptors I, III and V, the acceptance-regeneration cycle was repeated several times. Results of comparable cycles are reported in the table below.

TABLE I

| | Acceptor Applied | | | | |
|---|---|---|---|---|---|
| | I (Na) | II (Fe) | III (Na, Fe) | IV (K, Sb) | V (Na, Fe, Sb) |
| Acceptance at 270° C.: | | | | | |
| Space velocity, g. $SO_2$ per g. metal per hour | 0.072 | 0.33 | 0.063 | 0.28 | 0.31 |
| Load of the acceptor, percent: | | | | | |
| At the beginning of the acceptance | 41.3 | 0 | 60.9 | 0 | 15.7 |
| At $SO_2$ breakthrough [a] | 46.6 | 1.3 | 69.5 | 20.0 | 50.0 |
| $SO_2$ breakthrough time, minutes | 60 | 14 | 115 | 17 | 90 |
| Regeneration at 650° C.: | | | | | |
| Space velocity, g. methane per g. metal per hour | 0.4 | 0.18 | 0.18 | | 0.59 |
| Percentage regenerated | 4.9 | | 7.0 | | 42.9 |
| Rate of regeneration, g. sulfur per kg. acceptor per hour | 2 | | 5 | | 12.8 |
| Quantity of acceptor required for binding 1 kg. sulfur, kg | 500 | | 133.5 | | 66.7 |

[a] 50 parts by volume of $SO_2$ per million parts by volume of flue gas.

From the above data the following conclusions are apparent:

Acceptor II (iron only) is not serviceable because breakthrough of $SO_2$ occurs after only 14 minutes; at that time the acceptor has bound only 1.3% of the theoretical quantity of $SO_2$. From a comparison of the acceptors I (sodium only) and III (sodium and iron), it is clear that breakthrough time is about doubled upon addition of iron, and that the capacity for binding $SO_2$ is substantially increased. Antimony alone is not capable of raising the capacity of alkali oxide as appears from the test data for acceptor IV. Comparison of the test data of acceptors I, III and V shows that addition of both iron and antimony yields an even better result than addition of iron only. The uptake capacity (difference between percent load at beginning and end of acceptance) has been enhanced several fold and the regenerability and rate of regeneration have also been considerably increased. These results are reflected in the figures for the quantity of acceptor required to bind 1 kg. of sulfur.

We claim as our invention:

1. A process for removal of $SO_2$ from hot gas mixtures which comprises contacting the gas mixture in a treating zone at a temperature of 150° to 400° C. with a solid acceptor comprising a mixture of an alkali metal oxide and iron oxide dispersed on a carrier selected from the group of alumina, magnesia and chromia, the amount of iron present on the carrier being from about 0.01 to 20% by weight of the amount of alkali metal, and recovering a gas substantially reduced in $SO_2$ content.

2. The process of claim 1 wherein the amount of iron present on the carrier is from about 0.2 to 10% by weight of the amount of alkali metal.

3. The process of claim 1 wherein the carrier is alpha-alumina.

4. A continuous process for removing $SO_2$ from hot gases which comprises contacting the gas mixture in a treating zone at a temperature of 150° to 400° C. with a solid acceptor comprising a mixture of an alkali metal oxide and iron oxide dispersed on a carrier selected from the group of alumina, magnesia, and chromia, the amount of iron present on the carrier being from about 0.01 to 20% by weight of the amount of alkali metal, recovering a gas substantially reduced in $SO_2$ content, removing spent acceptor from the treating zone, regenerating spent acceptor by contacting it with reducing gas at a temperature of 400 to 700° C., and returning regenerated acceptor to the treating zone.

5. The process of claim 4 wherein the reducing gas is selected from the group consisting of carbon monoxide, hydrogen, methane, natural gas, and mixtures thereof.

6. A process for removal of $SO_2$ from hot gas mixtures which comprises contacting the gas mixture in a treating zone at a temperature of 150° to 400° C. with a solid acceptor comprising a mixture of an alkali metal oxide, iron oxide, and antimony oxide dispersed on a carrier selected from the group of alumina, magnesia, and chromia, the amount of iron and antimony present on the carrier each being from about 0.01 to 20% by weight of the amount of alkali metal, and recovering a gas substantially reduced in $SO_2$ content.

7. A continuous process for removing $SO_2$ from hot gases which comprises contacting the gas mixture in a treating zone at a temperature of 150° to 400° C. with a solid acceptor comprising a mixture of an alkali metal oxide, iron oxide and antimony oxide dispersed on a carrier selected from the group of alumina, magnesia, and chromia, the amount of iron and antimony present on the carrier each being from about 0.01 to 20% by weight of the amount of alkali metal, recovering a gas substantially reduced in $SO_2$ content, removing spent acceptor from the treating zone, regenerating spent acceptor by contacting it with reducing gas at a temperature of 400 to 700° C., and returning regenerated acceptor to the treating zone.

8. The process of claim 6 wherein the reducing gas is selected from the group consisting of carbon monoxide, hydrogen, methane, natural gas, and mixtures thereof.

References Cited

UNITED STATES PATENTS

| | | | |
|---|---|---|---|
| 1,562,480 | 11/1925 | Wietzel et al. | 252—464 X |
| 2,670,365 | 2/1954 | Watts et al. | 252—474 X |
| 2,992,884 | 7/1961 | Bienstock et al. | 23—2 |

OSCAR R. VERTIZ, *Primary Examiner.*

EARL C. THOMAS, *Assistant Examiner.*